July 3, 1934.  C. G. EDEN ET AL  1,965,408
MEANS FOR MOLDING WIRES IN GLASS
Filed March 2, 1932

INVENTOR
Christopher G. Eden
and
Colin J. Smithells
BY
M. H. Lockwood
ATTORNEY

Patented July 3, 1934

1,965,408

UNITED STATES PATENT OFFICE 1,965,408

MEANS FOR MOLDING WIRES IN GLASS

Christopher Gabriel Eden, Croxley Green, and Colin James Smithells, Bushey, England, assignors to The M-O Valve Company Limited, London, England Application March 2, 1932, Serial No. 596,188
In Great Britain March 24, 1931

1 Claim. (Cl. 49—66)

This invention relates to electric discharge tubes and more particularly to very small tubes, such, for example, as broadcast receiving valves.

In order to ensure correct spacing of the electrodes in such electric discharge tubes it is usual to space the electrode support wires apart in a straight line and hold them thus spaced by sealing them into a glass bead. This arrangement, however, suffers from the disadvantage that when there are several electrodes and the tubes are small there is very little room in which to space the electrode support wires: the object of the present invention is to overcome this difficulty.

Thus in a spacing device for electrode support wires, according to the present invention, the wires are sealed into a glass bead in an annular formation. The glass bead may have any suitable form, but is preferably an annular ring or disc, around which the wires are spaced.

Preferably the spacing devices are formed by pressing the glass between dies, through holes in which the electrode support wires are first passed, the holes being arranged in an annular formation and correctly spaced.

Figure 1:
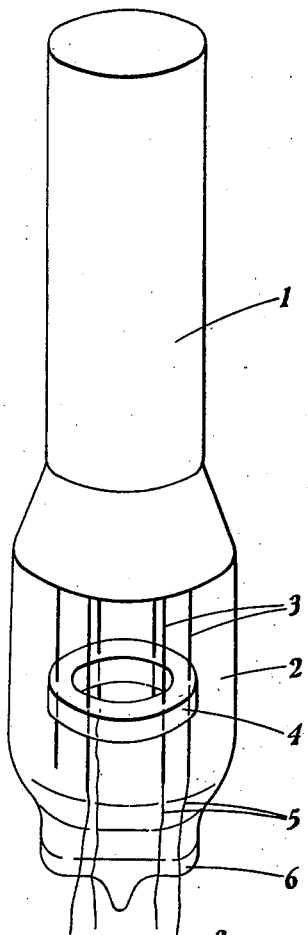

The invention will now be described, by way of example, with reference to the accompanying drawing. Figure 1 shows a broadcast receiving valve with electrode support wires arranged in an annular spacing device in accordance with the invention, whilst Figure 2 shows in section a pair of dies suitable for forming such an annular spacing device.

As shown in Figure 1, the envelope of the valve comprises a copper portion 1, which forms the anode, and a glass skirt 2. The electrode support wires 3 are suitably spaced apart and sealed into an annular glass ring 4 of square cross section; owing to the annular formation of the ring a very large number of wires may conveniently be sealed into the ring 4. The internal electrodes (not shown) are welded to the wires 3 at one end, and leading in wires 5 are welded to the wires 3 at the other end. The internal electrodes and the ring 4 are then inserted into the envelope and a pinch 6 formed at the foot of the skirt 2 to hold the leading in wires 5 and thus hold the ring 4 and internal electrodes in position.

Figure 2:
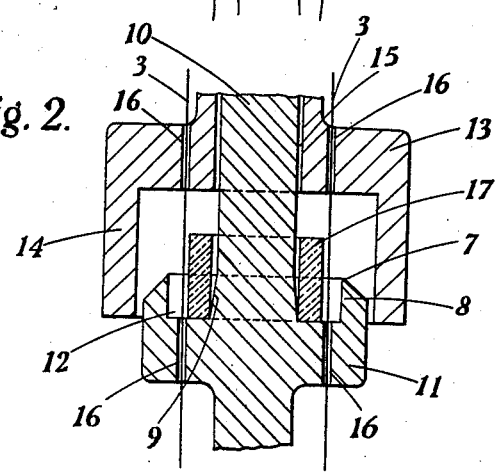

A spacing device in the shape of the glass ring 4 described above may conveniently be formed by means of the pair of dies shown in Figure 2. The bottom die consists of a vertical cylindrical member 10 projecting from a circular disc 11, the diameter of the cylinder 10 and disc 11 being respectively equal to the internal and external diameters of the ring 4. The disc 11 is provided around its circumference with an upwardly extending flange 8 having a sharp edge 7 and the height of the flange 8 is equal to the thickness of the ring 4, a channel 12 of similar shape to that of the ring 4 is thus formed between the flange 8 and the outer surface of the cylinder 10. The top die consists of a circular disc 13 around the circumference of which is arranged a depending flange 14 which can just embrace the flange 8 of the bottom disc 11. The disc 13 is provided with a central circular hole 15 through which the cylindrical member 10 of the bottom die is adapted to pass. The circular discs of both the top and bottom dies are pierced by holes 16 through which the wires 3 to be held in the spacing device can pass, these holes being so spaced as to ensure correct spacing of the electrodes.

To form an annular glass spacing device with the dies described above, a short length of glass tube 17, having an internal diameter approximately equal to that of the ring 4 which it is required to form and an external diameter considerably less than that of the ring 4, is placed over the cylindrical member 10 of the bottom die. The top die is then placed in position and the electrode support wires passed through holes 16 provided in the two dies. Finally the glass tube 17 is heated to soften it and the two dies pressed together; the glass is thus forced into the channel 12 to form a ring of the required shape with the electrode support wires embedded therein, any surplus glass being cut off by the sharp edge 7 of the flange 8. The two dies may now be withdrawn and the glass spacing device with the wires 3 embedded therein removed from the bottom die, to simplify this removal the part 9 of the cylindrical member 10 may be provided with a slight taper.

We claim:—

A mould for moulding a spacing device for the electrode support wires of an electric discharge tube with the electrode support wires embedded in the device comprising a bottom die provided with an upwardly projecting cylindrical member, and formed with a groove around the cylindrical member and a plurality of holes leading into the groove and a top die formed with a circular hole through which the cylindrical member is arranged to pass, and provided with a depending flange arranged to embrace the bottom die, the top die having a plurality of holes corresponding to the holes in the bottom die, the holes in the two dies being so arranged that the electrode support wires can pass through the holes and through the groove in the bottom die.

CHRISTOPHER GABRIEL EDEN.
COLIN JAMES SMITHELLS.